July 10, 1956 C. F. BALL ET AL Re. 24,178

CABLE REELING MECHANISM

Original Filed Feb. 26, 1947 3 Sheets-Sheet 1

Inventors:
Charles F. Ball.
Richard T. Hair.
by Louis A. Mason,
Att'y.

CABLE REELING MECHANISM

Original Filed Feb. 26, 1947 3 Sheets-Sheet 2

Inventors:
Charles F. Ball.
Richard T. Hair.
by
Louis A. Mason,
Atty.

CABLE REELING MECHANISM

Original Filed Feb. 26, 1947 3 Sheets-Sheet 3

Inventors:
Charles F. Ball.
Richard T. Hair.

by Louis A. Maxson
Atty.

United States Patent Office

Re. 24,178
Reissued July 10, 1956

24,178

CABLE REELING MECHANISM

Charles F. Ball and Richard T. Hair, Franklin, Pa., assignors to Joy Manufacturing Company, a corporation of Massachusetts Original No. 2,654,547, dated October 6, 1953, Serial No. 731,126, February 26, 1947. Application for reissue December 24, 1954, Serial No. 477,602

41 Claims. (Cl. 242—90)

Matter enclosed in heavy brackets [ ] appears in the original patent but forms no part of this reissue specification; matter printed in italics indicates the additions made by reissue.

Our invention relates primarily to improvements in cable reeling and paying out mechanisms particularly adapted for use on mine vehicles, and more particularly relates to a fluid motor drive and control apparatus for a cable reel on which there is wound the cable by which power is supplied to a self-propelled vehicle such as a "shuttle car" or mine locomotive of the gathering type.

In a preferred embodiment of the invention, the same may comprise a source of hydraulic fluid, a pump whose drive is independent of the propulsion of the vehicle with which the mechanism may be used, a motor-pump device operatively connected to a cable reel in such manner that neither can turn without the turning of the other, and an automatic valve mechanism including valves respectively operative to determine the pressure imposed on the motor-pump device when the cable is being wound in and operative to determine the back pressure imposed on the motor-pump device when the cable is being unwound, and an automatic shifter valve controlled at least in part by the pressure built up by the motor-pump device when the same is acting as a pump for shifting connections in such a manner that, whereas during winding in of the cable the relief device having the higher setting is in control, the relief device having the lower setting shall become operative when cable is to be pulled off of the reel, and the main pump discharge shall then be automatically relieved of substantially all back pressure. Desirably, there may be included in the means for controlling the position of the shifter valve mentioned, arrangements operative to place in control of the pressure in the line between the pump and motor-pump device, the pressure relief valve with the higher setting, when the reel comes to a stop.

An object of our invention is to provide an improved reel driving and controlling apparatus. Another object of our invention is to provide an improved hydraulic reel driving and control mechanism having the characteristics hereinabove mentioned as desirable. A further object of our invention is to provide an improved reel driving and control mechanism providing different pressures in the line between a pump and a motor-pump device in accordance with the direction of operation of the latter. Still another object of our invention is to provide an improved reel driving and control apparatus including a plurality of pressure relief valves and a shifter valve hydraulically controlled for the purpose of rendering one or the other of said relief devices effective to control the pressures in the line between the pump and motor-pump device. Yet a further object of our invention is to provide an improved reel driving and control apparatus including a plurality of differently set relief devices and a shifter valve constructed and arranged to render one or the other of said relief devices effective to control the pressures in a line between the pump and the motor-pump device dependent upon the direction of rotation of the latter, and also to provide an automatic institution of control of the relief device having the higher setting promptly upon the coming to a stop of the motor-pump device following a period of operation as a pump. Other objects and advantages of the invention will hereinafter more fully appear.

Referring to the drawings in which one illustrative embodiment which our invention may assume is shown:

Figure 1:
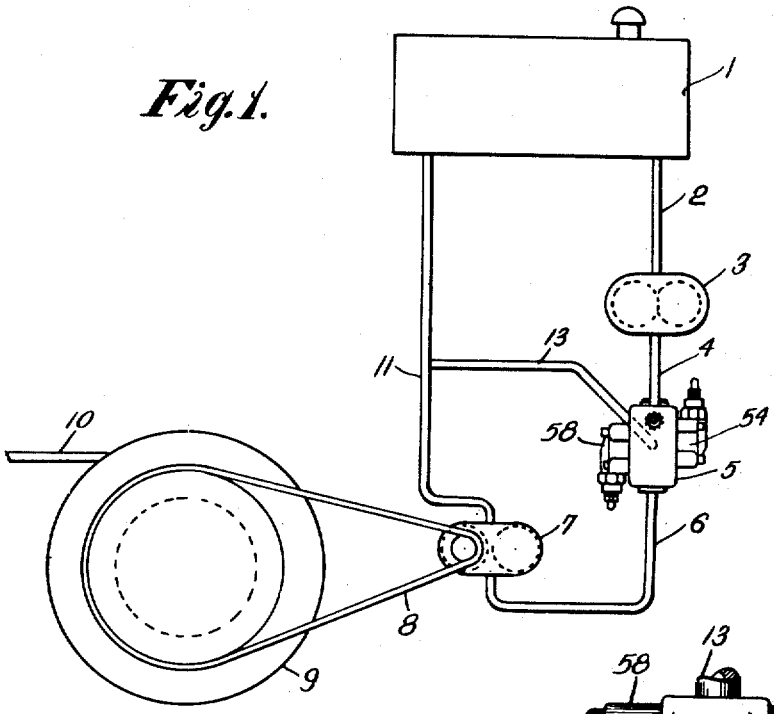
Fig. 1 is a diagrammatic view illustrating a form of fluid circuit and elements associated therewith arranged in accordance with our invention for driving and controlling a motor-pump device operatively connected with a cable reel.
Figure 2:
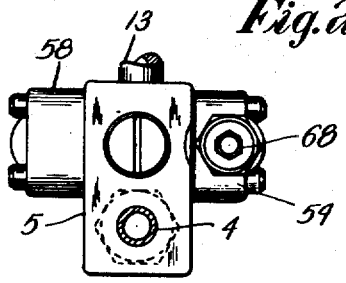
Fig. 2 is an enlarged end view of the relief and control valve mechanism shown in Fig. 1, the view being taken from what might be called the top, if the parts shown in Fig. 1 be considered to have the same relationship in space as is indicated on the first sheet of the drawings.
Figure 3:
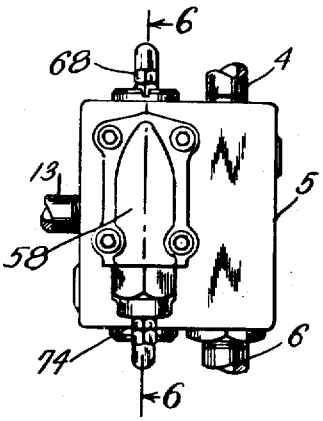
Fig. 3 is a view of the relief and control valve mechanism of Fig. 2 viewed from the left hand side thereof with the mechanism in the position indicated in Fig. 1.
Figure 4:
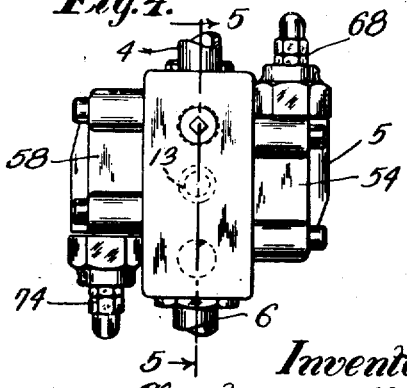
Fig. 4 is an enlarged view of the relief and control valve mechanism, showing the same in the position indicated in Fig. 1.
Figure 9:
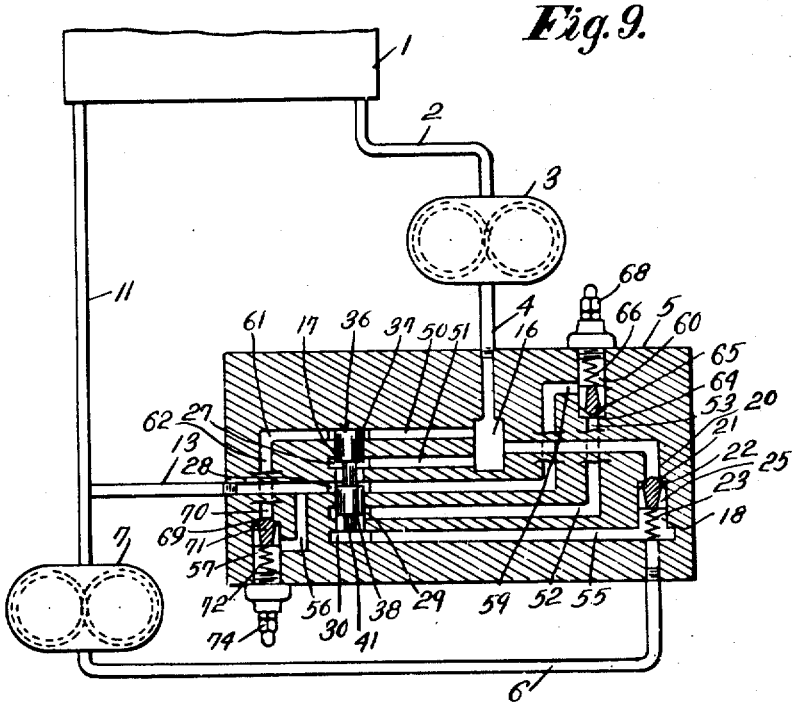
Figs. 9 and 10 are views similar to Fig. 1, but showing the relief and by-pass valve mechanism in, as it were, developed or schematic views so that all the passages therethrough and elements thereof may be followed in their working operations.
Figure 10:
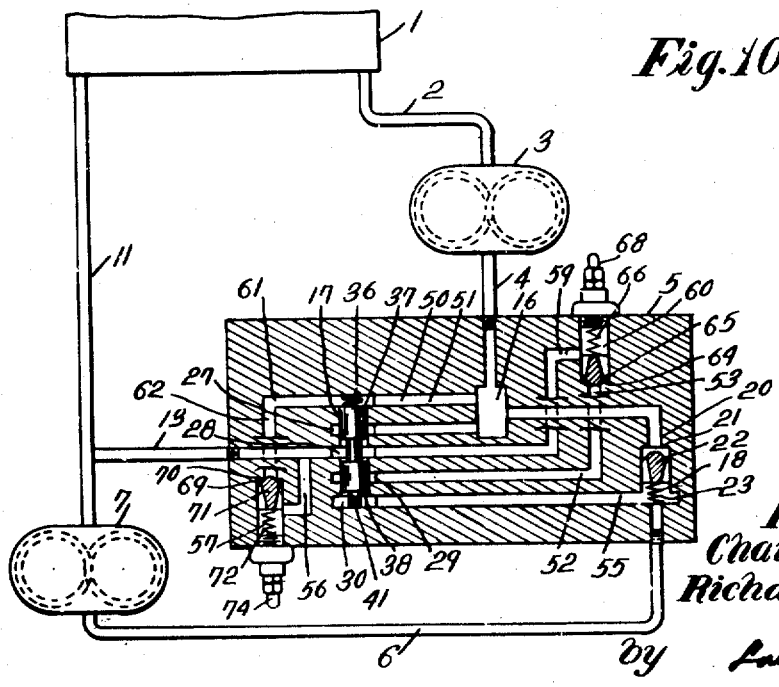

Referring now to the drawings, and first to Figs. 1, 9 and 10, it will be observed that a source of hydraulic fluid is shown at 1, as, for example, a suitably disposed tank, receptacle or sump, to contain the necessary quantity of hydraulic fluid. The source 1 is connected by a suitable suction line 2 with a main pump 3, which is driven from any suitable source of power, not shown. The pump 3 delivers fluid under pressure to a line 4 which is connected with a valve mechanism—a relief and shifter valve mechanism—5, which has a connection 6 with a motor-pump device 7 operatively connected, as by a belt 8, with a cable reel 9 upon which a power supply cable 10 is wound. Let it here be noted that while our invention is specifically described with reference to a cable reel carrying an electric cable for supplying current to electric motors, the same is not limited to such systems, but includes within its contemplation reels for flexible conductors for other operating media. The motor-pump device is connected with a conduit 11 which leads back to the source 1, and a relief line 13 leads from the valve mechanism 5 to the line 11. The pump 3 is shown as of the intermeshing gear type, as is also the motor-pump device 7. The specific details of the construction of the pump and motor-pump device and even the type thereof are not essential to our invention, and such devices are well known per se, and so they are not more extensively illustrated.

The valve mechanism 5 provides a chamber 16 to which hydraulic fluid is delivered by the conduit 4. From this chamber fluid may be delivered through a shifter valve chamber 17 back to the connection 13 leading to the source 1, or, as will shortly be described, to another chamber 18 which is connected with the conduit 6 leading to the motor pump device 7 and which communicates also with the shifter valve chamber 17, as later described.

Figure 5:
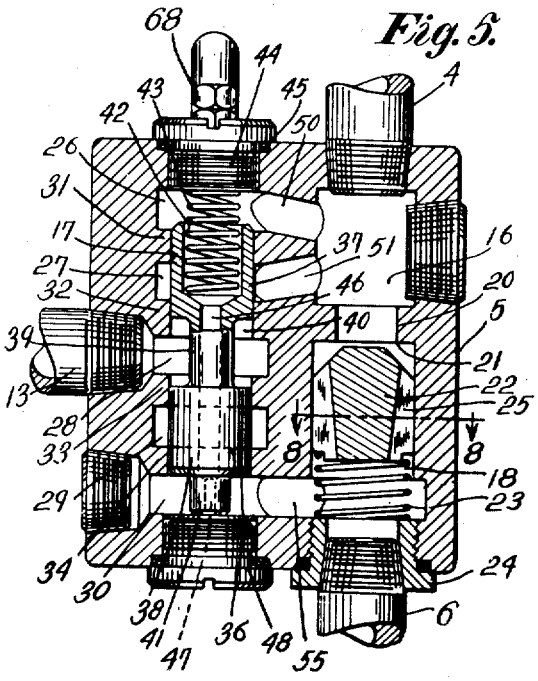
Fig. 5 is an enlarged sectional view on the plane of the section line 5—5 of Fig. 4.
Figure 7:
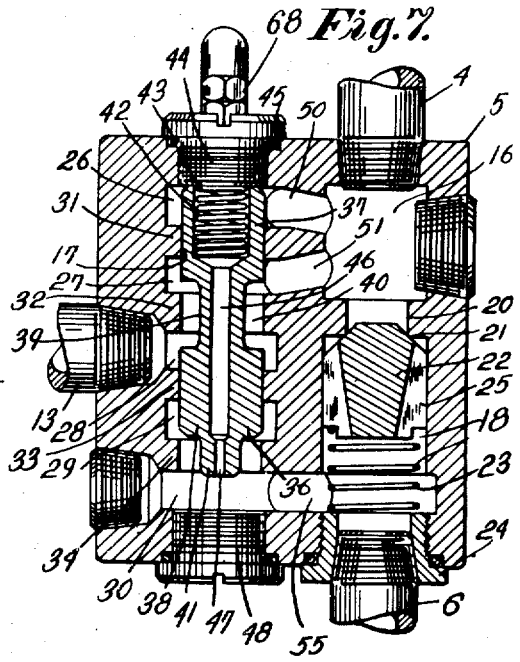
Fig. 7 is a sectional view on the same plane and scale as Fig. 5, with parts shown in different relative positions.
Figure 8:
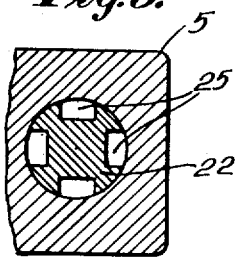
Fig. 8 is a fragmentary section taken on the plane of the line 8—8 of Fig. 5.

Desirably, the chambers 16 and 18 may be formed in line with each other, as shown in Figs. 5 and 7, and separated by a ported septum 20, which forms a valve seat 21, with which a check valve 22 is adapted to cooperate and against which said check valve is adapted normally to be maintained by a spring 23, which at one end rests against the check valve and at its other end rests upon a plug 24 with which the conduit 6 is threadedly or otherwise suitably connected. The structure of this check valve 22 may be seen from Fig. 8; and it will be noted that this valve has a number of slots 25 in its periphery through which fluid may flow from the chamber 16 to the chamber 18 when the valve 22 is unseated.

The shifter valve receiving chamber 17 includes five annular chambers, each spaced from the next adjacent chamber by a ported partition. These annular chambers, starting from the top in Fig. 5, are numbered respectively 26, 27, 28, 29 and 30. A ported partition 31 separates the chambers 26 and 27. A ported partition 32 separates the chambers 27 and 28. Similarly, ported partitions 33 and 34 respectively separate the chambers 28 and 29 and the chambers 29 and 30. Each of the ported partitions has the port therethrough of the same size as each of the others, and these several ports are coaxially arranged so that their surrounding walls provide guidance for a two-spooled shifter valve 36 comprising an upper hollow spool 37 and a lower spool 38, a connecting portion 39 of reduced cross section whose presence results in the provision of an annular fluid conducting groove 40, and a stop projection 41. The spool 37, as indicated, has a recess or chamber 42 therein into which extends a spring 43 whose upper end in Fig. 5 contacts an abutment plug 44 suitably packed at 45 to prevent leakage. A port 46 of relatively small diameter at its lower end 47 extends from the chamber 42 through the stop portion 41 of the valve 36. The stop portion of the valve is adapted to cooperate with a suitable abutment plug 48.

The annular chamber 26 communicates with the chamber 16 through a port or cored opening 50 (whether a bored port or a cored opening depending on whether the valve casing is machined from the solid or cast). Similarly, the annular space 27 communicates as at 51 with the chamber 16. The annular chamber 28 communicates through the conduit 13 with the conduit 11 leading to the source 1. The annular chamber 29 communicates through a port or opening 52 with a chamber 53 in a relief valve casing 54 shown in the drawings as a separate element from the main body of the valve mechanism as a whole, but obviously formable with it as a unit if desired. The annular space 30 communicates through an opening 55 with the chamber 18. The annular chamber 28 also communicates through a port opening 56 with a chamber 57 in another relief valve housing 58. The annular chamber 28 further communicates through an opening 59 with *a* [the] chamber 60 in the relief valve casing 54. The annular chamber 26 communicates through an opening 61 with a chamber 62 in the relief valve housing 58. The chamber 53 is separated from the chamber 60 by a ported valve seat 64 with which a spring pressed relief valve 65 is adapted to cooperate. A spring 66 having a follower 67 adjustably loaded by an adjusting screw and nut mechanism 68 controls the compression of the spring 66, and thus determines the pressure at which the valve 65 will lift from the seat 64. A valve seat 69 surrounding a port 70 extending between the chambers 57 and 62 is adapted to cooperate with a [releif] *relief* valve 71 pressed in a closing direction by a spring 72 which rests against a follower 73 whose position may be adjusted by suitable screw and nut mechanism 74. It will be noted that when the valve 36 is in top position, it does not prevent communication between the chamber 16 and the port 70. The normal compression of the spring 72 will be much higher than the normal compression of the spring 66 when they are controlling valves having equal areas subjected to pressures tending to unseat such valves. For example, it may require a liquid pressure of 300 p. s. i. in chamber 62 to unseat valve 71 while, for example, a pressure of 100 p. s. i. in chamber 53 will suffice to unseat valve 65.

Figure 6:
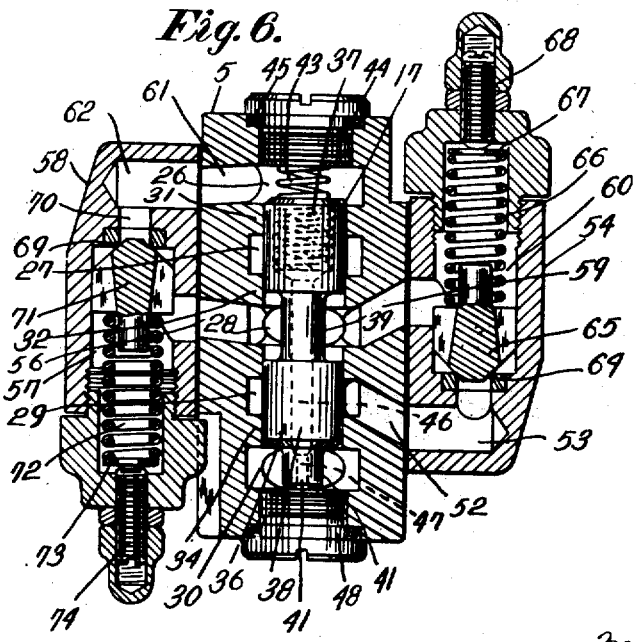
Fig. 6 is an enlarged sectional view on the plane of the line 6—6 of Fig. 3.

The pump 3 may be considered, for the purpose of describing the mode of operation of the embodiment of our invention which has been explained above, to be driven continuously while the vehicle is in use. Accordingly, it is taking in liquid from the source 1 through the conduit 2 and discharging it through the conduit 4 into the chamber 16, and the fluid so delivered to the chamber 16 must go somewhere. Obviously, from what has been said, it may at least in part go past the check valve 22 and through the conduit 6 and into the motor-pump device 7 and drive the latter in a direction to effect winding in of the cable 10, and then pass back to the source 1 through the conduit 11, if the cable can be reeled in. Because the rate of winding in of the cable will be controlled by the rate at which the vehicle moves in the direction in which the cable extends, it will be evident that all of the liquid pumped by the pump 3 cannot pass through the motor-pump device 7, under ordinary circumstances, at least, and accordingly provision is made for the return of the excess liquid discharged by the pump 3 to the line 11 through the connection 13. As considerable power must be exerted by the motor-pump device 7 to effect winding in of the cable at the desired maximum rate, the excess fluid must not be allowed to pass through the connection 13 so readily that the necessary pressure will not be maintained in the supply connection 6 to the motor-pump device 7. Accordingly, as above indicated, the compression of the spring 72 which controls the relief valve 71 will be made sufficient to compel the desired pressure to be maintained in the chamber 16 and in the conduit 6. For example, a pressure of 300 p. s. i. may be maintained in the fluid supply connections to the motor-pump device 7 by the appropriate setting of the spring 72. It will be noted that from the chamber 16 the port 50 opens into the annular chamber 26 and that the shifter valve 36 can never shut off communication through the chamber 26 between the port 50 and the port 61, and accordingly that whenever the pressure in the port 70 is high enough to unseat the relief valve 71 fluid may pass into the chamber 57 and through the port 56, and, referring to Figs. 6 and 7, through the chamber 28 to the conduit 13 and so back to the source 1 by way of the conduit 11. In Figs. 9 and 10, because of the desirability of avoiding overlapping ports, the connection of the conduit 13 with the chamber 28 is shown as made via a portion of the port 56 instead of opening into the chamber 28 separately from the port 56 and at right angles to the communication of that port with the chamber 28. Fig. 10, subject to the understanding just expressed, may be considered to show the normal position of the parts during the operation of the motor-pump device 7 in a direction to effect winding in of the cable 10; in other words, the mode of operation which occurs when the vehicle is moving in a direction to shorten the free length of the cable. It will be observed that the shifter valve 36 occupies at this time the position shown in Figs. 5, 6 and 10, being so held by reason of the fact that the hydraulic pressure on its lower end is less than the hydraulic pressure on its upper end by the amount occasioned by the presence of the *valve 22 and its* spring 23 and that, moreover, the spring 43 operates to hold the shifter valve 36 in the position mentioned.

Let it now be supposed that the vehicle is brought to a stop. This will mean that the motor-pump device 7 will no longer drive the reel to wind in the cable, but nothing will occur in the controlling apparatus which will result in a movement of this shifter valve 36 to reduce the pressure imposed on the motor-pump device 7, and so the cable tension will be maintained undiminished when the vehicle is at a standstill.

Suppose now that the vehicle is caused to move in a direction which will necessitate the unwinding of the cable from the reel in order for such motion to take place. The motor pump device 7 will then be driven in the opposite direction, and initially against the full pressure maintained by the setting of the relief valve device 71. However, the instant that the motor-pump device commences to draw fluid from the source 1 through the conduit 11 and to discharge *such fluid* into the conduit 6, the valve 22 will seat, and the only passage for flow of the fluid which can be established will be one opened by upward movement of the shifter valve 36 to the position shown in Figs. 7 and 9; and, because the pressure which will be built up momentarily may be in excess of the pressure imposed by the pump 3, which cannot exceed 300 p. s. i., or whatever other selected pressure may be fixed by the relief valve mechanism 71, the valve 36 will move upward to the position mentioned. When this occurs the fluid pumped by the main pump 3 will pass from the chamber 16 through the port 51 into the chamber 27, through the groove between the spools of the shifter valve into the chamber 28, and freely through the conduits 13 and 11 back to the source. Note that the back pressure on the main pump 3 has been completely removed except for such pressure as friction of the liquid in the passages may involve. Upward movement of the shifter valve 36 will also open a passage *for flow of fluid* from the chamber 30 to the chamber 29, and, when the valve 65 is unseated, through the chamber 60 and port 59 to the groove 28 and through the latter and by way of the conduits 13 and 11 back to the source. The valve 65 is unseated at a much lower pressure, as above indicated, than the valve 71, say, at a pressure of 100 p. s. i. in the chamber 53, and accordingly the tension on the cable 10 will be substantially reduced and the reel may be turned backwards, driving the motor-pump device 7 as a pump, with a much lower pressure in the line 6 than during the operation of the motor-pump device as a motor.

Now let it be assumed that the vehicle stops. The motor-pump device no longer acts as a pump and no longer delivers fluid through the conduit 6. The passage 46, 47 permits equalization of pressures at the opposite ends of the shifter valve 36 practically immediately, and the spring 43 forces the shifter valve back to the position shown [n] *in* Figs. 5, 6 and 10. This interrupts communication between the passages 52 and 55 and between the chamber 16 and the conduit 13. Accordingly the pressure of the fluid in the supply line 6 and chamber 16 will build up to the value at which the relief valve 71 will be unseated. Therefore it will be evident that when the vehicle comes to a stop conditions will automatically result which will cause the motor-pump 7 to be subjected to the higher pressure necessary for most efficient winding in operations when the vehicle commences to move in the direction where winding in of the cable is needed. Indeed the cable tension will be immediately increased.

From the foregoing description, it will be evident that we have provided an improved reel operating and controlling mechanism, one in which when reeling in is necessary, a relatively high pressure will be imposed on the reel driving motor (motor-pump device), one in which when the rotation of the reel causes the driving of the then pump-function-performing motor-pump device, there will be a very substantial reduction in the pressure against which the motor-pump device has to pump fluid, and there will be, moreover, a complete relief of the pressure against which the main pump delivers. Moreover, there will be an automatic building up of the discharge pressure of the main pump to the higher value suited for winding in purposes whenever the vehicle comes to a standstill. The mechanism is simple, compact, not subject to serious possibility of derangement and involves a minimum number of cooperating elements, and it is entirely automatic in its operation. Moreover, it will be evident that we have provided an improved automatic control valve mechanism in which a shifter valve, automatically controlled, places differently set relief valves in control of the critical pressure in accordance with different operations of the apparatus controlled and is adapted automatically to provide a free discharge for the normal operating fluid when it is not being used for motor actuation, thereby reducing power and avoiding excessive heating. This forms the subject matter of *Patent No. 2,654.382, granted October 6, 1953 upon* our application Serial No. 275,694, filed March 10, 1952, which application is a continuation of our divisional application Serial No. 80,374, filed March 9, 1949, and now forfeited.

*The motor-pump device 7 may also be designated merely as a motor, or designated selectively as a motor-pump unit. Moreover, the valve element 36 may be referred to as a blocking valve, as, when the motor-pump unit is acting as a motor, as illustrated in Fig. 10, it blocks the passage of fluid from the motor-pump unit to the reservoir past the control or relief valve 65, while in the situation depicted in Fig. 9, it unblocks the connection between conduits 55 and 52 and permits fluid to flow from the motor-pump unit 7 to the reservoir past the relief valve 65. Again, it may be noted that in the position of the parts shown in Fig. 9, the valve element 36 has been moved into a position in which relief of pressure from the conduit means 6 through (or past) the relief valve element 65 is effected and thus a tension is maintained on the paying out cable as predetermined by the maximum pressure setting of the relief valve 65.*

*In Fig. 9 the relief valve 71 is in series with the valve 36, i. e. the latter blocks the flow of fluid to relief valve 71, while in Fig. 10 the relief valve 65 is in series with the valve 36 i. e. the latter blocks the flow of fluid to relief valve 65. Each of the relief valves has, of course, an upstream side, according to usual flow controlling valve terminology.*

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a cable reeling mechanism adapted to supply power to a moving vehicle, a winding reel adapted to have a cable wound thereon, a fluid motor for driving said reel in a direction to wind cable thereon, a fluid pump, and a pressure line connecting said pump to said motor, said motor being rotatable by said winding reel as a pump when cable is pulled off of the reel, means for imposing on said motor when it is driven as a pump a back pressure, substantial, but substantially lower than the pressure applied by said pump to it when it is acting as a motor and driving said reel, and automatically operative means for substantially completely relieving the back pressure on said pump when said motor is acting as a pump.

2. In a cable reeling mechanism adapted to supply power to a moving vehicle, a winding reel adapted to have a cable wound thereon, a fluid motor for driving said reel in a direction to wind cable thereon, a fluid pump, and a pressure line connecting said pump to said motor, said motor being rotatable by said winding reel as a pump when cable is pulled off of the reel, means for imposing on said motor when it is driven as a pump a back pressure lower than the pressure applied by said pump to it when it is acting as a motor and driving said reel, and automatically operative means for controlling said last means controlled by the fluid discharged by said motor when acting as a pump.

3. In a cable reeling mechanism adapted to supply power to a moving vehicle, a winding reel adapted to have a cable wound thereon, a fluid motor for driving said reel in a direction to wind cable thereon, a fluid pump, and a pressure line connecting said pump to said motor, said motor being rotatable by said winding reel as a pump when cable is pulled off of the reel, and means controlled by fluid discharged by said motor when the latter is acting as a pump for automatically imposing, when said vehicle is moving in a direction to require the pulling of cable off the reel and said motor is being driven as a pump: (a) on said motor a back pressure which is appropriate to cable unwinding and which is much lower than the pressure at which said pump supplies fluid to said motor during cable winding, and (b) on said pump a much lower back pressure than the back pressure then imposed on said motor.

4. In a cable reeling mechanism adapted to supply power to a moving vehicle, a winding reel adapted to have a cable wound upon it, a motor-pump device operable as a motor to drive said reel in a direction to wind cable thereon, a fluid pump, a pressure line connecting said pump to said motor-pump device, said motor-pump device being rotatable by said winding reel to cause the same to operate as a pump when cable is pulled off of the reel, and means for imposing on said motor-pump device a predetermined supply pressure when it is operating as a motor and a lower back pressure when it is being driven by the reel and acting as a pump, including a valve element movable to different positions to effect said changes in pressure and actuated by fluid discharged by said motor-pump device when the latter is driven by the reel.

5. In a cable reeling mechanism adapted to supply power to a moving vehicle, a winding reel adapted to have a cable wound upon it, a motor-pump device operable as a motor to drive said reel in a direction to wind cable thereon, a fluid pump, a pressure line connecting said pump to said motor-pump device, said motor-pump device being rotatable by said winding reel to cause the same to operate as a pump when cable is pulled off of the reel, and means for imposing on said motor-pump device a predetermined supply pressure when it is operating as a motor and a lower back pressure when it is being driven by the reel and acting as a pump, including a valve element movable to different positions to effect said changes in pressure and having oppositely facing areas thereon for fluid pressure to act upon, and means for subjecting said oppositely facing areas to fluid discharged respectively by said pump, and by said motor pump device when the latter is acting as a pump.

6. In a cable reeling mechanism adapted to supply power to a moving vehicle, a winding reel adapted to have a cable wound upon it, a motor-pump device operable as a motor to drive said reel in a direction to wind cable thereon, a fluid pump, a pressure line connecting said pump to said motor-pump device, said motor-pump device being rotatable by said winding reel to cause the same to operate as a pump when cable is pulled off of the reel, means for imposing on said motor-pump device a predetermined supply pressure when it is operating as a motor and a lower back pressure when it is being driven by the reel and acting as a pump, including a valve element movable to different positions to effect said changes in pressure and actuated by fluid pumped by said motor-pump device when the latter is driven by the reel, and means also including said valve element for substantially wholly relieving the back pressure imposed on said fluid pump when cable is being pulled off of the reel.

7. In combination, a winding reel having a cable thereon adapted to be wound in or payed off, a motor connected to said reel to drive the latter to wind in the cable when supplied with operating medium and to be driven backwards by the reel when cable is pulled off of the reel, means for supplying operating medium to said motor to drive the same to effect winding in of said cable, said operating medium supply means including a device movable to reduce the force required to drive the motor backwards as compared with the force exerted by the motor when driving the reel, and means for subjecting a surface on said device to an operating pressure provided by the operating medium discharged by said motor when the same is driven backwards, to effect movement thereof.

8. In combination, a winding reel having a cable thereon adapted to be wound in or payed off, a motor connected to said reel to drive the latter to wind in the cable when supplied with operating medium and to be driven backwards by the reel when cable is pulled off of the reel, means for supplying operating medium to said motor to drive the same to effect winding in of said cable, said operating medium supply means including a device movable to reduce the force required to drive the motor backwards as compared with the force exerted by the motor when driving the reel, and means for subjecting opposed surfaces on said device respectively to operating medium delivered by said means for supplying operating medium at the delivery pressure thereof and to fluid discharged by said motor when the latter is driven backwards, to control movements thereof.

9. In combination, a winding reel adapted to be mounted upon a vehicle for movement therewith and having a cable thereon adapted to be attached to a fixed point and to be wound in or payed off as the vehicle moves towards or away from such fixed point, a fluid motor-pump device connected to said reel to drive the latter to wind in the cable when supplied with operating fluid under pressure and to be driven by the reel and then to act as a pump when cable is pulled off of the reel due to movement of the reel away from such fixed point, pump means for supplying operating fluid under pressure to said motor-pump device to drive the same to effect winding in of said cable, a receptacle for fluid from which said pump can draw fluid and to which said motor-pump device can exhaust fluid when acting as a motor, a by-pass for fluid pumped by said pump and not passing through said motor-pump device, means for imposing on said pump a predetermined back pressure when said motor-pump device is operating as a motor, and means operated by fluid discharged by said motor-pump device when operating as a pump for then reducing the back pressure on the pump.

10. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a one-way connection for the flow of fluid from said pump to said motor-pump device, means for conducting fluid after it has done work in said motor-pump device back to said source, a relief connection between said one-way connection and said source having a relief valve therein set to open upon the attainment of a relatively high pressure in said one-way connection, another relief connection arranged between said one-way connection and said source and having a relief valve therein set to open upon subjection to a relatively lower pressure, and means for preventing flow from said one-way connection to said second relief connection when said motor-pump device is driving said reel.

11. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a one-way connection for the flow of fluid from said pump to said motor-pump device, means for conducting fluid after it has done work in said motor-pump device back to said source, a relief connection between said one-way connection and said source having a relief valve therein set to open upon the attainment of a relatively high pressure in said one-way connection, another relief connection arranged between said one-way connection and said source and having a relief valve therein set to open upon subjection to a relatively lower pressure, and means for preventing flow from said one-way connection to said second relief connection when said motor-pump device is driving said reel including a valve device movable by pressure built up by said motor-pump device when the same is acting as a pump.

12. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a one-way connection for the flow of fluid from said pump to said motor-pump device, said one-way connection having a check valve therein for limiting the flow therethrough to but one direction, means for conducting fluid after it has done work in said motor-pump device back to said source, a relief connection between said one-way connection and said source having a relief valve therein set to open upon the attainment of a relatively high pressure in said one-way connection, another relief connection arranged between said one-way connection and said source and having a relief valve therein set to open upon subjection to a relatively lower pressure, and means for preventing flow from said one-way connection to said second relief connection when said motor-pump device is driving said reel including a valve device having oppositely facing areas in continuous communication with said one-way connection at opposite sides of the check valve therein.

13. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, and means for automatically respectively connecting the discharge of said pump freely to said source and imposing on said motor-pump device a back pressure independent of the free discharge of said pump, whenever said reel is unwinding.

14. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, and means for automatically connecting the discharge of said pump freely to said source and imposing on said motor-pump device a substantial back pressure independent of the free discharge of said pump, whenever said reel drives said motor-pump device as a pump.

15. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, and means governed by the pressure built up by the operation of said motor-pump device as a pump for automatically connecting the discharge of said pump freely to said source and imposing on said motor-pump device a back pressure higher than the then discharge pressure of said pump, whenever said reel drives said motor-pump device as a pump.

16. In combination, a winding reel mounted upon a vehicle for movement therewith and adapted to have a cable wound thereon and to wind *in* said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid at a relatively high pressure to drive said motor-pump device as a motor to effect reel drive, and means, automatically operative whenever said reel drives said motor-pump device as a pump, and including a valve governed by pressure changes produced as said motor-pump device shifts from operation as a motor to operation as a pump, automatically interrupting the connection through which the pump supplies fluid to the motor-pump device to cause the latter to effect reel drive, and establishing a connection to said source for the discharge, against a back pressure lower than said relatively high pressure and appropriate to cable unwinding, of fluid then pumped by said motor-pump device.

17. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and at least in part as a suction line when said motor-pump device is driven by said reel, a conduit connecting said first and second conduits, conduit means for connecting said first conduit to said source having a relief valve therein set at a relatively high relief pressure, conduit means for connecting said first conduit to said source having between its ends a valve shiftable to open and close the same, and conduit means for connecting said second conduit to said source having a relief valve therein set at a relatively low relief pressure.

18. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and at least in part as a suction line when said motor-pump *device* is driven by said reel, a conduit *connecting* [connnecting] said first and second conduits and having a valve associated therewith for preventing flow therethrough from the second conduit to the first, conduit means for connecting said first conduit to said source having a relief valve therein set at a relatively high relief pressure, conduit means for connecting said first conduit to said source having between its ends a valve shiftable to open and close the same, and conduit means for connecting said second conduit to said source having a relief valve therein set at a relatively low relief pressure.

19. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and at least in part as a suction line when said motor-pump device is driven by said reel, a conduit connecting said first and second conduits, conduit means for connecting said first conduit to said source having a relief valve therein set at a relatively high relief pressure, conduit means for connecting said first conduit to said source having between its ends a valve shiftable to open and close the same, and conduit means for connecting said second conduit to said source having a relief valve therein set at a relatively low relief pressure and also controlled by said shiftable valve.

20. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and at least in part as a suction line when said motor-pump device is driven by said reel, a conduit connecting said first and second conduits and having a valve associated therewith for preventing flow therethrough from the second conduit to the first, conduit means for connecting said first conduit to said source having a relief valve therein set at a relatively high relief pressure, conduit means for connecting said first conduit to said source having between its ends a valve shiftable to open and close the same, and conduit means for connecting said second conduit to said source having a relief valve therein set at a relatively low relief pressure and also controlled by said shiftable valve.

21. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and at least in part as a suction line when said motor-pump device is driven by said reel, a conduit connecting said first and second conduits and having a valve associated therewith for preventing flow therethrough from the second conduit to the first, conduit means for connecting said first conduit to said source having a relief valve therein set at a relatively high relief pressure, conduit means for connecting said first conduit to said source having between its ends a valve shiftable to open and close the same, and conduit means for connecting said second conduit to said source having a relief valve therein set at a relatively low relief pressure and also controlled by said shiftable valve, said shiftable valve having oppositely facing surfaces continuously connected in communication, one with said first conduit, and the other with said second conduit.

22. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and at least in part as a suction line when said motor-pump device is driven by said reel, a conduit connecting said first and second conduits and having a valve associated therewith for preventing flow therethrough from the second conduit to the first, conduit means for connecting said first conduit to said source having a relief valve therein set at a relatively high relief pressure, conduit means for connecting said first conduit to said source having between its ends a valve shiftable to open and close the same, and conduit means for connecting said second conduit to said source having a relief valve therein set at a relatively low relief pressure and also controlled by said shiftable valve, said shiftable valve having oppositely facing surfaces continuously connected in communication, one with said first conduit, and the other with said second conduit and having associated therewith means for providing a restricted communication between said surfaces and a spring for biasing said valve in the direction in which the surface subjected to the pressure in said second conduit faces.

23. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure each including a yieldably loaded relief valve, and means controlled by fluid pumped by said motor-pump device for precluding release through the second mentioned fluid releasing means while the motor-pump device is operating as a motor and for rendering said second mentioned fluid releasing means operative when said motor-pump device is operated as a pump.

24. In combination, a winding reel adapted to have a cable wound thereon and to wind in the cable or to have the cable drawn off therefrom, a reservoir for a hydraulic fluid, a pump having driving means, a motor-pump device, a driving connection between the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including means for releasing fluid at a relatively high pressure and means for releasing fluid at a relatively lower pressure each including a yieldably loaded relief valve, means for precluding release through the second mentioned fluid releasing means while the motor-pump device is operating as a motor and for rendering said second mentioned fluid releasing means operative when said motor-pump device is operated as a pump, and means for connecting pump discharge freely to said reservoir while communication thereof with said second mentioned fluid releasing means is precluded.

25. In a reel driving and controlling apparatus, in combination, a source of hydraulic fluid, a pump having means for driving it continuously during the use of said apparatus, a motor-pump device having a connection alternatively serving as a supply and as a discharge connection, a cable reel, operative connections between said motor-pump device and cable reel such that neither can rotate without the rotation of the other, and an automatic valve mechanism including relief devices respectively having higher and lower settings and respectively operative to determine the pressure imposed on the motor-pump device at said connection when the cable is being wound in and operative to determine the back pressure imposed on the motor-pump device at said connection when the cable is being payed out, an automatic shifter valve, and means for subjecting said shifter valve to the pressure built up by the motor-pump device at said connection when said motor-pump device is acting as a pump, for shifting the position of said valve to transfer control of the pressure existing at said connection from the relief device having the higher setting to the relief device having the lower setting, when cable is pulled off of the reel.

26. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid for driving said motor-pump device as a motor to effect reel drive, conduit means including a discharge connection from said pump, a connection for the flow of fluid from said pump discharge connection to said motor-pump device and a connection for conducting fluid after it has done work in said motor-pump device back to said source, a relief connection from said pump discharge connection back to said source having a relief valve therein set to open upon the attainment of a pressure in said pump discharge connection suited to driving by said motor-pump of said reel to effect cable winding, another relief connection communicable with the motor-pump device for fluid discharged by said motor-pump device when cable is being drawn off the reel, said another relief connection also having a relief valve therein, said latter relief valve set to open upon subjection to a lower pressure suited to cable unwinding, and valve means for preventing, when said motor-pump device is driving said reel, flow of fluid in transit from said pump to said motor-pump device through said another relief connection and for interrupting, when cable is being drawn off the reel, communication between the pump discharge connection and said motor-pump device and concurrently connecting the then discharge side of the latter with said another relief connection.

27. In combination, a winding reel mounted upon a vehicle for movement therewith and adapted to have a cable wound thereon and to wind in said cable or to have the same drawn off of said reel depending upon the direction of vehicle movement, a motor-pump device connected to said reel to drive the latter to effect winding of said cable and to be driven by said reel as cable is pulled off of the latter, a source of hydraulic fluid, a pump connected to said source to draw fluid therefrom and to supply fluid to drive said motor-pump device as a motor to effect reel drive, a first conduit, to which first conduit said pump discharges, a second conduit, said second conduit connected to said motor-pump device and alternatively operative to conduct fluid received from said first conduit to said motor-pump device to drive the latter as a motor and to serve as a discharge line from said motor-pump device when the latter is driven by said reel and acts as a pump, a conduit connecting said motor-pump device with said source and alternatively serving as an exhaust line when said motor-pump device drives said reel and as a suction line when said motor-pump device is driven by said reel, conduit means for connecting said first conduit to said source having a relief valve therein set at a relatively high relief pressure, conduit means for connecting said second conduit to said source having a relief valve therein set at a relatively low relief pressure, and means for selectively connecting said second conduit with said first conduit and with said first conduit means, while said second conduit means is cut off from communication with said second conduit, and connecting said second conduit with said second conduit means only, while said first conduit is connected with said first conduit means only.

28. In combination, a winding reel adapted to have a cable wound thereon and to wind in the cable or to have the cable drawn off therefrom, hydraulic driving means for said winding reel including a reservoir for a hydraulic fluid, a pump having driving means, a motor-pump device, a driving connection betewen the motor-pump device and the reel, a connection between the reservoir and the pump, a connection between the pump and the motor-pump device, a connection between the motor-pump device and the reservoir, means for releasing fluid from the connection between the pump and the motor-pump device to the reservoir including a yieldably loaded relief valve for releasing fluid at a relatively high pressure, and means for reelasing fluid at a relatively lower pressure from said motor-pump device when cable is pulled off the reel and said motor-pump device is acting as a pump including a yieldably loaded relief valve, and means for precluding release through the second mentioned fluid releasing means while the motor-pump device is operating as a motor and for rendering said second mentioned fluid releasing means operative to release fluid from said motor-pump device when the latter is operated as a pump, including a valve movable automatically between opposite positions as there is a shift from cable winding to unwinding and controlling connection of said motor-pump device with said means for releasing fluid at a relatively lower pressure.

29. In a cable reeling mechanism adapted to supply power to a moving vehicle, a reel adapted to have a power cable wound thereon, a fluid motor for driving said reel in a direction to wind cable thereon, a fluid pump, means having a pressure responsive relief valve in communication therewith for delivering fluid from said fluid pump to said fluid motor to cause the latter to drive said reel, said motor being rotatable by said reel as a pump when cable is pulled off the reel, and means for releasing, when said vehicle is moving in a direction to require the pulling of cable off the reel, fluid from said motor, said fluid releasing means bypassing said pressure responsive relief valve and imposing on said fluid from said motor a pressure lower than that of the setting of said pressure responsive relief valve and including another pressure responsive relief valve through which fluid from the motor only is discharged.

30. In a cable reeling mechanism, a winding reel adapted to have a power cable wound thereon, a motor-pump device connected with said reel for driving the same in a direction to wind cable thereon and to be driven backwards and act as a pump when cable is pulled from the reel, a fluid pump, a source of hydraulic fluid connected with the intake of said pump, and means for effecting the delivery of fluid from said fluid pump to said motor-pump device to effect reel drive in a winding-in direction and to permit the discharge of fluid from said fluid pump and from *said* [siad] motor-pump device back to the reservoir when the motor-pump device is being driven backwards by the reel including means for imposing on the motor-pump device a relatively high pressure when it is acting as a motor and a relatively lower pressure when it is acting as a pump including a pair of pressure responsive relief valves one connectable in communication with the motor-pump device when the latter is acting as a motor and the other when the motor-pump device is acting as a pump, and means for effecting their connection only alternatively in communication with said motor-pump device.

*31. In a cable reel mechanism for a vehicle adapted to be supplied with electric power from a fixed point and adapted to move towards and away from said fixed point, characterized by a winding drum mounted on said vehicle for movement therewith, a cable on said drum connected to said fixed point for providing a power connection from said fixed point to said vehicle and adapted to be wound upon or payed off of said drum when said vehicle moves toward or away from said fixed point, a fluid reservoir, a pump connected thereto for supplying fluid under pressure; a fluid motor-pump unit connected to the pump and drivably connected to said drum and driven in one direction by pressure fluid from said pump as a fluid motor for driving said drum to wind cable thereon, and driven in the opposite direction as a pump responsive to movement of said drum in a direction to pay off cable therefrom; control valve means for controlling the pressure of said pressure fluid; the improvement comprising a second control valve connected between said motor-pump unit and said reservoir, said second control valve being set to relieve at a lower pressure than the first-mentioned control valve means, and a blocking valve connected between said motor-pump unit and said reservoir and operable, when the latter acts as a motor and pump, respectively, to block and unblock the passage of fluid from said motor-pump unit to reservoir through said second control valve.*

*32. In apparatus of the class described, a hydraulic system including a reservoir and a pump for supplying pressure fluid, fluid operated mechanism drivable in one direction by said pressure fluid as a motor and drivable in another direction as a pump: the combination therewith of valve control means for limiting the back pressure on said fluid operated mechanism when acting as a pump, and for limiting the working pressure of said pressure fluid from said first named pump comprising a valve body having a shiftable valve member therein, said valve member having a first shifted position when said fluid operated mechanism acts as a motor, and a second shifted position when said fluid operated mechanism acts as a pump, and relief valve means including a first relief valve connected in series with said valve member in said first shifted position thereof to operate at a predetermined value, and a second relief valve connected in series with said valve member in said second shifted position thereof to operate at a different predetermined value.*

*33. In a cable reeling mechanism adapted to supply power to a moving vehicle, a winding reel adapted to have a cable wound upon it, a motor-pump device operable as a motor to drive said reel in a direction to wind cable thereon, a fluid pump, a pressure line connecting said pump to said motor-pump device, said motor-pump device being rotatable by said winding reel to cause the same to operate as a pump when cable is pulled off of the reel, and means for imposing on said motor-pump device a predetermined supply pressure when it is operating as a motor and a lower back pressure when it is being driven by the reel and acting as a pump including a check valve arranged in said pressure line and held open by fluid passing through said pressure line from said fluid pump to said motor-pump device when the motor-pump device is driving the reel and maintained closed when the motor-pump device is acting as a pump, and a relief valve element subjected, in a direction to open it to the fluid discharged from the motor-pump device when the latter is driven by the reel as aforesaid and movable by such fluid to vent the latter to maintain a back pressure on said motor-pump device lower than that which prevails in said pressure line when said motor-pump device is driving the winding reel.*

*34. In a cable reeling mechanism adapted to supply power to a moving vehicle, a winding reel adapted to have cable wound thereon, a fluid motor for driving said reel in a direction to wind cable thereon, a fluid pump, and a pressure line connecting said pump to said motor, said motor being rotatable by said winding reel as a pump when cable is pulled off of the reel, and automatic means for imposing on said motor when it is driven as a pump, a back pressure lower than the pressure applied by said fluid pump to it when it is acting as a motor and driving said reel including a valve element moved by the fluid discharged by said motor when acting as*

*a pump to a position to release fluid then displaced by said motor.*

*35. In a cable reeling mechanism adapted to supply power to a moving vehicle, a winding reel adapted to have a cable wound thereon, a fluid motor for driving said reel in a direction to wind cable thereon, a fluid pump, and a pressure line connecting said pump to said motor, said motor being rotatable by said winding reel as a pump when cable is pulled off of the reel, and means for imposing on said motor when it is driven as a pump a back pressure lower than the pressure applied by said pump to it when it is acting as a motor and driving said reel, including a valve having means for subjecting it to fluid discharged by said motor when the later is acting as a pump and movable by such fluid to a position permitting release of fluid discharged by said motor, when so acting, against such lower back pressure, and when the motor is driving the reel, subjected, in a direction to oppose movement to the position aforesaid, to the pressure then applied by said pump to said motor.*

*36. In a cable reeling mechanism, a winding reel adapted to have a power cable wound thereon, a motor-pump device connected with said reel for driving the same in a direction to wind cable thereon and to be driven backwards and act as a pump when cable is pulled from the reel, a fluid pump, a reservoir constituting a source of hydraulic fluid connected with the intake of said pump, and means for effecting the delivery of fluid from said fluid pump to said motor-pump device to effect reel drive in a winding-in direction and to permit the discharge of fluid from said fluid pump and from said motor-pump device back to the reservoir when the motor-pump device is being driven backwards by the reel, including means for imposing on the motor-pump device a relatively high pressure when it is acting as a motor and a relatively lower pressure when it is acting as a pump including a pair of pressure responsive relief valves one for limiting the pressure of the fluid delivered to the motor-pump device when the latter is acting as a motor and the other for limiting the back pressure on the motor-pump device when the latter is acting as a pump, said one relief valve having its upstream side cut off from communication with said motor-pump device when the other is limiting the back pressure on said motor-pump device.*

*37. In a cable reeling mechanism adapted to supply power to a moving vehicle, a winding reel adapted to have a cable wound upon it, a motor-pump device operable as a motor to drive said reel in a direction to wind cable thereon, a fluid pump, a pressure line connecting said pump to said motor-pump device, said motor-pump device being rotatable by said winding reel to cause the same to operate as a pump when cable is pulled off of the reel, and means for imposing on said motor-pump device a predetermined supply pressure when it is operating as a motor and providing for the venting, against a back pressure lower than said supply pressure, of the fluid which it discharges when it is being driven by the reel and acting as a pump including a check valve openable by fluid discharged by said fluid pump when the motor-pump device is driving the reel and closable automatically when the fluid between the same and said motor-pump device attains a predetermined relation to the then discharge pressure of said fluid pump, and a shiftable valve element subjected to the fluid discharged from the motor-pump device when the latter is driven by the reel as aforesaid and said check valve is closed and precluding venting as aforesaid until moved by the fluid so discharged.*

*38. A mechanism as set forth in claim 37 wherein said shiftable valve element is spring loaded and has an abutment relative to which it is movable and with which it has one end yieldingly engaged when said check valve is open, said check valve when closed causing a back pressure to be built up as said motor-pump device acts as a pump to cause the fluid then pumped by said motor-pump device to shift said shiftable valve to provide for said motor-pump device a venting of fluid at a reduced pressure.*

*39. A mechanism as set forth in claim 38 wherein said check valve is spring loaded and is biased toward its seat by its spring, and both spring loaded valves are contained in a valve casing to which said pressure line is connected, and in which a fluid conducting line connects said casing with the discharge side of said motor-pump device.*

*40. A mechanism as set forth in claim 39 wherein there exists a direct fluid connection in said valve casing between the abutment engaging end of said shiftable valve and said check valve, whereby when said check valve is closed said abutting end of said shiftable valve is caused to be subjected to the pressure of the fluid discharged from said motor-pump device when the latter is acting as a pump as aforesaid.*

*41. In a cable reel mechanism for a vehicle adapted to be supplied with electric power from a fixed point and adapted to move toward and away from said fixed point, characterized by a winding drum mounted on said vehicle for movement therewith, a cable on said drum connected to said fixed point for providing a power connection from said fixed point to said vehicle and adapted to be wound upon or paid off of said drum when said vehicle moves toward or away from said fixed point, a fluid reservoir, a pump connected thereto for supplying fluid under pressure, a fluid motor-pump unit connected to the pump and drivably connected to said drum and driven in one direction by pressure fluid from said pump as a fluid motor for driving said drum to wind cable thereon, and driven in the opposite direction as a pump responsive to movement of said drum in a direction to pay off cable therefrom, a control valve for controlling the pressure of said pressure fluid; the improvement comprising a second control valve connected between said motor-pump unit and said reservoir, said second control valve being set to relieve at a lower pressure than the first mentioned control valve, and a blocking valve connected between said motor-pump unit and said reservoir and operable, when the motor-pump unit acts as a motor and pump, respectively, to block and unblock the passage of fluid from the connection between the pump and motor-pump unit to the reservoir through said second control valve.*

References Cited in the file of this patent or the original patent

UNITED STATES PATENTS

| | | |
|---|---|---|
| 2,090,707 | Sloane | Aug. 24, 1937 |
| 2,220,479 | De Bell | Nov. 5, 1940 |
| 2,395,302 | Slomer | Feb. 19, 1946 |
| 2,406,120 | Wirth | Aug. 20, 1946 |
| 2,665,081 | Slomer | Jan. 5, 1954 |